May 13, 1952 W. H. HOWE 2,596,955
APPARATUS FOR MEASURING DIRECT VOLTAGES
Filed Dec. 6, 1946 2 SHEETS—SHEET 1

Fig. 1.

INVENTOR
*Wilfred H. Howe*
BY
*Blair, Curtis + Hayward*
ATTORNEYS

May 13, 1952      W. H. HOWE      2,596,955
APPARATUS FOR MEASURING DIRECT VOLTAGES Filed Dec. 6, 1946      2 SHEETS—SHEET 2

Fig. 2.

INVENTOR
Wilfred H. Howe
BY
Blair, Curtis & Hayward
ATTORNEYS

Patented May 13, 1952

2,596,955

UNITED STATES PATENT OFFICE 2,596,955

APPARATUS FOR MEASURING DIRECT VOLTAGES

Wilfred H. Howe, Sharon, Mass., assignor to The Foxboro Company, Foxboro, Mass., a corporation of Massachusetts Application December 6, 1946, Serial No. 714,611

27 Claims. (Cl. 73—359)

This invention relates to methods and apparatus for measuring or comparing electrical characteristics; and more particularly to such methods and apparatus for measuring small direct current potentials indicative of the values of changing conditions.

In the measurement and control of industrial processes, it is necessary to determine the value of many conditions such as temperature, pressure, flow, pH concentration, conductivity, chemical concentration and the like. Many of the sensitive elements available for the measurement of such conditions produce small changes in electrical values such as potentials, capacities and the like which are difficult to measure accurately. This is especially true when small direct current values are to be measured, as is the case when a thermocouple is used as the measuring element. Although small condition sensitive alternating current potentials may be amplified with relatively standard electronic amplifiers before measurement, amplification of condition responsive small direct current potentials can be accomplished only with elaborate amplifying equipment, and then only with difficulty because of the drift phenomena and other problems usually encountered in such direct current amplifiers. The present invention provides novel methods and apparatus whereby variable electrical characteristics, and especially small direct current potentials, can be measured without difficulty with simple equipment using conventional electronic tube amplifiers.

These novel advantages are achieved by interconnecting two or more condensers each with an associated voltage to charge the condensers, and then adjusting one of these associated capacities or potentials to produce a predetermined relationship between their values so that the value of the adjusted element is a measure of the quantity being determined.

The present invention will be illustrated herein as applied to the measurement of the small D. C. potentials developed by thermocouples. In the past the conventional method of measuring the temperature of a thermocouple has been to compare the thermocouple potential to the potential drop across a portion of a slide-wire potentiometer and to vary the position of the slide-wire contact until the two potentials are equal as indicated by a null-current indicator. Suitable accuracy is achieved in the usual commercial instruments by periodically checking the potential developed across a predetermined portion of the slide-wire circuit with the potential developed by a standard potential cell. In such measurements it is not possible to use the standard cell itself as a source of potential for the potentiometer because such cells provide a standard potential only under conditions of negligible current drain. They are rendered useless when any appreciable current is drawn from them, even for short periods of time.

Although used extensively, this conventional type of thermocouple potential measuring device is subject to the disadvantage that it must be calibrated periodically by comparison with the standard potential cell in order to maintain its accuracy of measurement. This process requires either the frequent attention of an operator or considerable complex equipment to achieve the result automatically. By using the present invention, a thermocouple potential may be directly compared with the potential of a standard cell without the need for any intermediate potentiometer circuit, and without any deleterious effect upon the standard cell. In addition, this advantageous result may be achieved while using as a rebalancing mechanism a continuously variable electrical condenser. This permits the rebalancing mechanism to be a balanced mechanical structure of low friction so that it may be easily operated and readily adapted for use with various recording and control mechanisms. These desirable results are accomplished, with the present invention, by charging two condensers from the thermocouple potential to be measured and a standard cell potential, and then adjusting the capacity of one of these condensers until certain predetermined conditions of charge are obtained, e. g. until the potential across each condenser is equal to the potential of its associated source. When this condition is established, the value of the adjusted capacity is a measure of the thermocouple potential being determined, and the adjusted condenser may be calibrated directly in terms of the thermocouple voltage or the temperature.

Accordingly, it is an object of this invention to provide novel methods and apparatus for the direct and continuous comparing of unknown electrical values with known electrical values without the need for intermediate standards; as well as for the comparing of unknown values to determine and control the ratios therebetween.

It is another object of this invention to provide novel methods and apparatus for achieving such a comparison of a plurality of potentials by relating each such potential to an associated capacity and establishing a predetermined function between the capacities as an indication of the value being determined; and, conversely, for the comparing of a plurality of capacities by relating each to an associated potential and establishing a predetermined function therebetween to produce the desired measurement.

It is a further object of this invention to provide such novel methods and apparatus for the comparison of small potentials; and particularly the measurement of small direct current potentials such as those developed by thermocouples.

It is also an object of this invention to provide such novel methods and apparatus as to permit the measurement of such small potentials by direct comparison with sources of standard potentials, and to permit such comparison even with standard sources of extremely small power output.

Another object of this invention is to provide such novel methods and apparatus which permit the accurate operation of a plurality of indicating, recording and/or controlling instruments from a single thermocouple element.

Other objects and advantages of this invention will be in part obvious and in part pointed out hereinafter. These objects and advantages are attained by the novel methods and apparatus described in the following specification, and they may be more readily understood by reference to the accompanying drawings in which:

Figure 1:
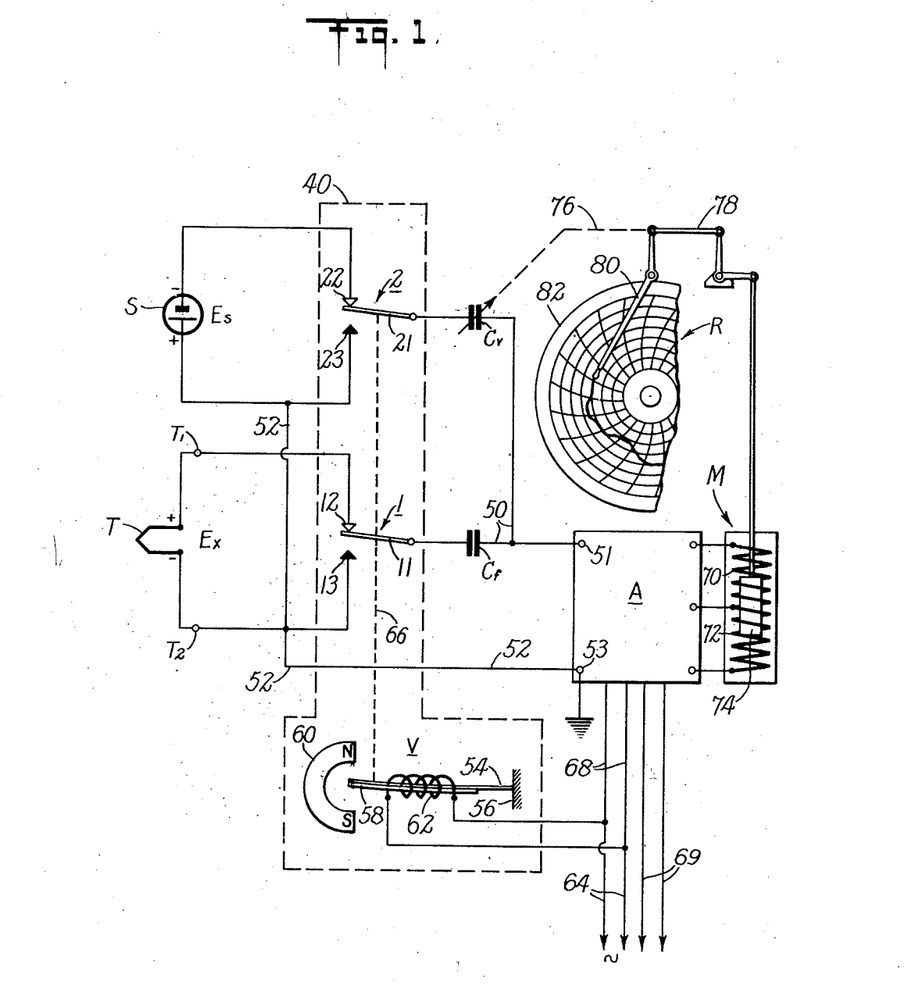
Figure 1 is a schematic wiring diagram of a temperature recorder mechanism incorporating the present invention.

In the temperature recorder mechanism shown in Figure 1, the unknown potential to be measured is that of a thermocouple T connected to a measuring circuit through terminals T1 and T2. The measuring apparatus includes a standard potential cell S, a vibratory-motor-operated double-pole double-throw switch structure, generally indicated by V within the dotted line 40, a fixed condenser $Cf$ associated with the thermocouple T, a variable re-balancing condenser $Cv$ associated with the standard cell S, an amplifier and phase discriminating unit, generally indicated at A, an electrically operated motor mechanism, generally indicated at M, for changing the capacity of the variable condenser $Cv$, and a suitable recorder mechanism, generally indicated at R. The positive thermocouple terminal T1 is connected to one outer contact 12 of a single-pole double-throw switch element, generally indicated at 1, in the vibrator switch structure V, and its negative terminal T2 is connected to the other outer contact 13 of this switch element. The central contact 11 of this switch element 1 is connected to one terminal of the fixed condenser $Cf$. The other terminal of the condenser $Cf$ is connected through a conductor 50 to one input terminal 51 of the amplifier unit A. The negative terminal T2 of the thermocouple T is also connected through a conductor 52 to the positive side of the standard cell S and to the other input terminal 53 of the amplifier unit A, which terminal preferably is grounded for shielding purposes. The positive side of the standard cell S is connected through the grounded conductor 52 to one outer contact 23 of the other single-pole double-throw switch element, generally indicated at 2, of the vibrator switching structure V; and the negative terminal of standard cell S is connected to the other outer contact 22 of switching element 2. The central contact 21 of this switching element 2 is connected to one terminal of the balancing variable condenser $Cv$, the other terminal of which is connected to the input terminal 51 of amplifier unit A through conductor 50. The contacts 22 and 23 of switching element 2 correspond to contacts 12 and 13 of switching element, respectively, and they are so arranged as to be opened and closed simultaneously therewith.

The driving means for operating switching elements 1 and 2 of the switching unit V might be any suitable mechanism capable of operating these switching elements in synchronism at some desired frequency such as the frequency of a commercial alternating current power supply line. In the described embodiment of this invention, the driving mechanism is a vibrator arrangement formed of a resilient reed-like member 54 anchored at one end 56 and carrying on its other end an armature portion 58 which is positioned between the poles of a permanent magnet 60. A winding 62, surrounding the magnetic portion 58, is connected to lines 64 supplying power at the desired operating frequency. With this arrangement, the polarity of the free end of the armature 58 changes at the operating frequency, thus causing it to move back and forth between the poles of the permanent magnet 60. The motion of the armature 58 is transmitted by some suitable mechanical means, shown diagrammatically by the broken line 66, to the center contacts 11 and 21 of the switching elements 1 and 2, respectively, to cause these contacts simultaneously to alternately make and break contact with their respective contacts 12 and 13, and 22 and 23, at the frequency of the power supply 64. A rotary commutator arrangement driven by a synchronous motor forms another simple and efficient mechanism for accomplishing this synchronized switching operation.

The amplifier unit A may be any suitable electronic tube amplifier system capable of properly amplifying the unbalance A. C. potentials from the measuring circuit applied between the terminals 51 and 53, and of comparing the phase of this amplified potential with the phase of the supply line 64, introduced into the amplifier unit A through conductors 68. It is preferable that this amplifier have a sufficiently high input impedance so as to present a negligible load to the thermocouple and standard cell circuits i. e. one which will not detrimentally affect the accuracy of measurement. Further, it is desirable that this unit A be highly sensitive only to the synchronizing frequency supplied by supply line 64 by the provision of suitable frequency selective circuits so as to limit the response of the instrument to the unbalance potentials developed in the measuring circuit just described. The power supplied for operating this unit A may be derived from the supply lines 64, or from some other power supply through lines 69. The comparison of the phases of these two potentials determines the relative energization of two sections 70 and 72 of the winding of the solenoid motor M. An amplifier and phase differentiating unit suitable for use as the unit A is disclosed and described in detail in the co-pending application of Wilfred H. Howe and Robert W. Cushman, Serial No. 496,438, entitled Measuring Apparatus. As the details of this structure per se do not form a portion of the present invention, reference is made to this co-pending application for further details. It is sufficient to state here that this unit comprises a vacuum tube amplifier and two phase differentiating vacuum tubes which are energized, respectively, by oppositely phased voltages synchronized with the voltage supplied to the winding 62 of vibrator V, and thus with the unbalance voltages applied to its terminals 51 and 53. Thus the amplified unbalance voltage is either in phase with the voltage applied to one of these tubes and out of phase with the voltage of the other tube, or vice versa. These two tubes, in turn, control the differential energization of the windings 70 and 72 of motor M.

The solenoid motor M also may be of the type described in the above-mentioned co-pending application. The armature 74 of this motor M is connected by a suitable mechanical arrangement, shown diagrammatically by the broken line 76, to the balancing variable condenser $C_v$. In addition, these interconnected elements, i. e. armature 74 and condenser $C_v$, are connected by a mechanical linkage, shown diagrammatically as a lever system 78, to a pen 80 of the recorder mechanism R, whereby the position, and thus the capacity, of the balancing condenser $C_v$ is recorded on a chart 82 as a measure of the temperature to which the thermocouple T is exposed.

This novel apparatus carries out the methods of the present invention by charging two condensers, e. g. condensers $C_f$ and $C_v$, with charges related to the values of an unknown potential and a known potential, e. g. potentials $E_x$ and $E_s$, and comparing the relationship produced by the charges on these condensers with a selected reference condition. This reference condition is the condition of the relationship which exists when the measuring circuit is in a predetermined condition of balance. In the present embodiment of this invention, this balanced condition has been chosen as the condition in which the unbalance or deviation potential applied to the balance-detecting apparatus, i. e. amplifier unit A, is zero. Based on this comparison, the capacity of one of these condensers, e. g. condenser $C_v$, is adjusted until the relationship does not change as the comparison is made. When this is achieved, the capacity of $C_v$ is a measure of the value of the unknown potential $E_x$. In the embodiment shown, this follows from the fact that, with these condensers $C_v$ and $C_f$ connected in series, they are always equally charged. This may be expressed by the equation $Q_f=Q_v$ in which $Q_f$ and $Q_v$ are the charges on the fixed and variable condensers, respectively. Because of the electrical characteristics of capacitors that the charge Q (in coulombs) is equal to the product of the potential E (in volts) across the condenser and its capacity C (in farads), the equations $E_fC_f=Q_f$ and $E_vC_v=Q_v$ may be written, wherein $E_f$ and $E_v$ are the potentials across the fixed and variable condensers, respectively. The equation $E_fC_f=Q_f=Q_v=E_vC_v$ follows. Since the balance condition has been defined above as the condition in which the unbalance voltage is zero, when balance occurs the sum of the unknown potential $E_x$ plus the potential across the fixed condenser $E_f$ must be zero, and therefore $E_f=E_x$. Likewise, the sum of the potential of the standard cell $E_s$ plus the potential across the variable condenser $E_v$ must be equal to zero, and therefore $E_s=E_v$. Substituting these values, we arrive at the equation $E_xC_f=E_sC_v$, the selected reference condition. This may also be expressed as that condition in which the ratio of the values of the two capacities is inversely proportional to the ratio of their associated voltages, i. e. $C_v/C_f=E_x/E_s$. Since $C_f$ is the capacity of the fixed condenser and $E_s$ is the fixed potential form the standard cell, it is apparent that $E_x=kC_v$, where $k$ is a constant equal to $E_s/C_f$. Thus, the capacity of the variable condenser $C_v$ is a measure of the unkown potential $E_x$, when the capacity of the variable condenser $C_v$ is adjusted to produce the predetermined condition of balance.

Thus, referring specifically to Figure 1, the novel methods of the present invention are carried out by charging two condensers $C_v$ and $C_s$ connected in series so that the combined potential across the two condensers is equal to the sum of the thermocouple potential $E_x$ and the standard cell potential $E_s$, and then adjusting the capacity of variable condensers $C_v$ until the unbalance potential between the point of connection of the two condensers and the grounded connection 52 between the thermocouple and the standard cell is zero. When this condition is established, the potential across condenser $C_f$ associated with the thermocouple is exactly equal and opposite to the potential $E_x$ of the thermocouple, and the potential of the condenser $C_v$ associated with the standard cell is exactly equal and opposite to the potential $E_s$ of the standard cell. Since the two condensers are in series, as described above, the charge on one condenser is exactly equal to the charge on the other condenser, and therefore the ratio of the capacities of the two condensers is inversely proportional to the potential across these condensers. Under these circumstances, when the unbalance potential at the common point of connection is zero, the predetermined relationship is satisfied, i. e. the ratio of the capacity of variable condenser $C_v$ to the capacity of fixed condenser $C_f$ is proportional to the ratio of the thermocouple voltage $E_x$ to the standard cell voltage $E_s$. As one of these condensers is fixed and of known value, and assuming the standard cell potential to be accurately known, then the capacity of the variable condenser $C_v$ is an accurate measure of the thermocouple potential $E_x$.

Considering the operation of this embodiment of the invention in greater detail, with switch arms 11 and 21 of the switching elements 1 and 2 in the positions shown in Figure 1 in which they complete their circuits through contacts 12 and 22, respectively, a closed series circuit or loop is formed by thermocouple T, condenser $C_f$, condenser $C_v$, and standard cell S. The balance-detecting amplifier unit A is connected across this circuit between the conductor 52 connecting the two potential sources T and S, and the conductor 50 connecting the two condensers $C_f$ and $C_v$. Because the amplifier unit A has such a high input impedance as to have only a negligible effect on the charge conditions of the condensers, when the capacities of the two condensers $C_f$ and $C_v$ are inversely proportional to the magnitudes of the voltage $E_x$ of the thermocouple T and $E_s$ of the standard cell S, the unbalance voltage existing between the amplifier input terminals 51 and 53 will be zero, i. e. there will be no change in the potential applied to these input terminals as the switching elements 1 and 2 are moved to their alternate positions in which switch arms 11 and 21 are connected to the grounded contacts 13 and 23. This is so because as explained above, the charge on the two condensers $C_f$ and $C_v$ will be equal, with the voltage across condenser $Cf$ equal and opposite to the voltage $Ex$ of the thermocouple T, and the voltage across condenser $Cv$ equal and opposite to the voltage $Es$ of the standard cell S. If this relationship is not maintained, an unbalance voltage will appear between the terminals 51 and 53 of the amplifier unit A, i. e. the potential applied to these terminals will change as the switch arms 11 and 21 move from one alternate position to the other. Thus, if the thermocouple voltage $Ex$ increases, the desired relationship no longer exists and an unbalance voltage appears at the amplifier input terminals. This unbalance voltage or change in potential will be proportional in magnitude and polarity or phase, to the amount and direction of the change of the condition being measured, i. e. the change in the thermocouple potential $Ex$, which causes a change from the desired relationship. The polarity of this unbalance or deviation voltage at the amplifier input terminals is the same as the polarity of the larger product $ExCf$ or $EsCv$, i. e. the polarity of the thermocouple voltage $Ex$ if the temperature increases and the polarity of the standard cell voltage $Es$ if the temperature decreases. This change in the condition, i. e. in the thermocouple voltage $Ex$, can be countered by changing the capacity of the balancing condenser $Cv$ until the desired relationship is restored, as indicated by a reduction to zero of the unbalance voltage at the amplifier input terminals 51 and 53. As pointed out above, in the embodiment of the invention herein described, this is achieved automatically by operating condenser $Cv$ by the motor M from the output of the amplifier unit A in a direction tending to restore the condition of balance.

Another advantage of the present invention is that it provides a control potential which is a function of the difference between two predetermined relationships and thus between the values of two quantities, e. g. between the values of two D. C. potentials, between the capacities of two condensers, between the value of an unknown D. C. potential and a potential corresponding to the capacity of a condenser as shown by the equations outlined above, and the like. For example, if the embodiment of the invention described herein is operated without the automatic rebalancing motor M, a voltage is produced at the input terminals 51, 53 of amplifier unit A which in magnitude and polarity, i. e. phase, is a function of the amount and direction of the difference between the temperature of thermocouple T and the temperature corresponding to the setting of condenser $Cv$. When so operated, the condenser $Cv$ is set manually to a position corresponding to the desired temperature, and the unbalance voltage, suitably amplified as by the amplifier portion of unit A, may be used to deflect the pointer of an indicating meter arrangement such, for example, as that shown in the above-mentioned Howe et al. application. Such operation also is of advantage for control purposes when this control potential developing instrument is combined with a controller which responds to the fluctuation of a condition, e. g. to an indicator pointer operated by the unbalance voltage of measuring circuit, as shown in U. S. Patent No. 2,244,564, to C. E. Mason.

The condensers $Cf$ and $Cv$ are discharged periodically by the action of the vibrator V in connecting them through contacts 13 and 23, respectively, to ground. This periodic action not only provides a comparison of the relationship produced by the charges on the condensers with the selected reference condition, i. e. an effective zero value which serves as an axis of measurement of the unbalance potential; but, due to the rapidity of its operation, it provides an alternating unbalance potential which may be readily amplified by conventional amplifiers.

The advantageous operation of the apparatus just described can also be achieved by alternate connections. For example, by reversing the polarity of either the thermocouple T or the standard cell S, and by inverting the operation of one of the switching elements 1 or 2 with respect to the other so that switch arm 11 connects with contact 12 when switch arm 21 connects with contact 23, another mode of operation results. With the apparatus connected in this manner, instead of the zero unbalance voltage which indicates the condition of balance with the apparatus connected as shown in Figure 1, a finite voltage always is applied to terminals 51 and 53 of amplifier unit A even when the circuit is balanced. The balanced condition occurs when there is no change in this voltage applied across the amplifier terminals as the switch arms 11 and 21 move from one position to the other. However, under this condition of balance, the same principle of measurement applies, namely that the change in capacity of balancing condenser $Cv$ is a direct measure of the change in the value of the unknown voltage $Ex$.

In such measuring instruments embodying the present invention, it can be seen that the unknown potential, i. e. the potential $Ex$ of thermocouple T, is compared directly and continuously with a known potential, i. e. the potential $Es$ of the standard cell S, through the medium of the charge on two condensers $Cf$ and $Cv$ without the need of the intermediate potentiometer circuit customarily employed in such measurements. Whenever a change in the unknown potential alters the network potential relationship, the amplifier unit A, motor M, and linkage 76 operate to adjust the variable condenser $Cv$ in the proper direction and in an amount which tends to restore the desired potential distribution for a condition of balance. The use of a variable condenser as the rebalancing element and of an electronic unbalance detecting mechanism permits so fast a rebalancing action that such an instrument can follow changes in a condition which would be much too rapid to be followed by the usual slide-wire potentiometer type instrument.

A measuring instrument of the type herein described also has the advantage that the current drain on the thermocouple and on the standard cell is not only extremely minute but also that it is constant at all times regardless of state of balance or unbalance of the measuring circuit. In contrast, in the usual potentiometer-type thermocouple potential measuring circuit, when the instrument is away from its balance point an appreciable current is drawn from these elements which may seriously affect the accuracy of measurement. This feature of the present invention advantageously permits any number of indicating, recording and for controlling instruments to be operated from a single thermocouple element because of the constant load on the thermocouple so that there is no interaction between multiple instruments so connected. Furthermore, although the use of capacities in the measuring circuit permits this advantageous operation, because operation of the invention depends upon the charge in the condensers employed rather than on their impedance, satisfactory operation of this measuring apparatus is substantially independent of the power factor of the condensers used, i. e. of the quality and constancy of the condenser insulation.

In commercial instruments, embodying the present invention, for measuring temperature with a thermocouple, certain additional adjustments and refinements are usually required. The present invention provides for the ready incorporation of such features. It may happen that the thermocouple T is exposed to such a temperature that its voltage $Ex$ will be zero, i. e. to a temperature precisely equal to the temperature of its cold-junction. Therefore, in order to maintain the inverse ratio relationship $$Ex/Es = Cv/Cf$$

inasmuch as $Es$ and $Cf$ have fixed values, it is obvious that $Cv$ must have zero capacity. This is an impossible accomplishment with available variable condensers because they always have some minimum capacity. This problem becomes even more difficult if the thermocouple T is exposed to a temperature less than the temperature of its cold-junction, for then the thermocouple potential $Ex$ becomes negative and thus it is necessary for the capacity of $Cv$ not only to be reduced to zero but actually to effectively act as a negative capacity. In accordance with the present invention this effect is achieved by providing a novel arrangement which acts to effectively reduce the capacity of $Cv$ to zero or even to a minus value.

Figure 2:
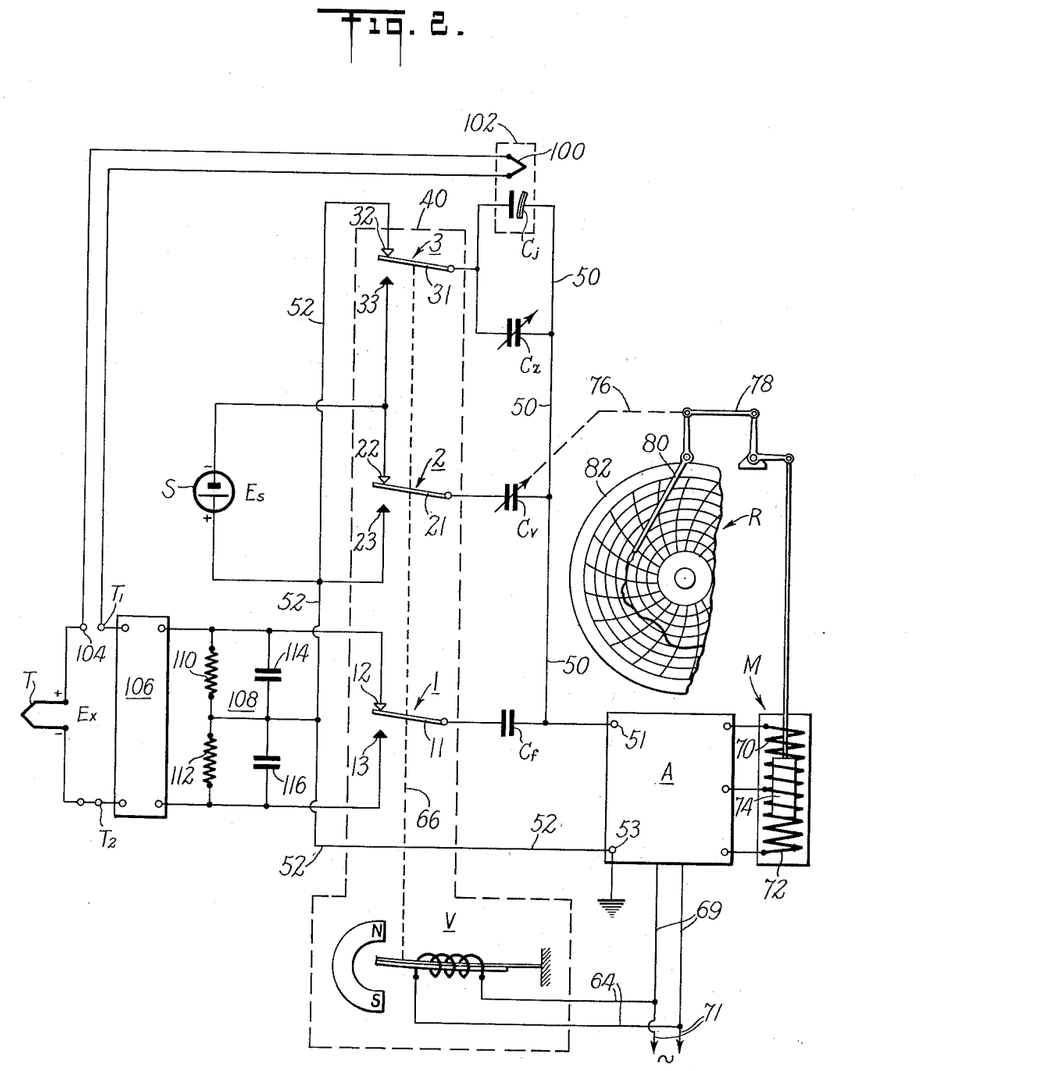
Figure 2 is a schematic wiring diagram of another temperature recorder mechanism similar to that shown in Figure 1 but incorporating additional control features and refinements.

Referring to Figure 2, in which all elements corresponding to elements in Figure 1 carry the same reference characters as in Figure 1, a third switching element, generally indicated at 3, is provided in the vibrator switching mechanism V. A manually adjustable variable condenser $Cz$ is connected between the central contact 31 of the switching element 3 and the connection 50 between the common sides of condensers $Cf$ and $Cv$ and the input terminal 51 of the amplifier unit A. One of the outside contacts 32 of this switching element 3 is connected to the common grounded conductor 52 and thence to the other input terminal 53 of amplifier A. The other outside contact 33 is connected to the terminal of the standard cell S that is connected to the contact 22 of switching element 2. The contacts of switching element 3 are so oriented with respect to the contacts of switching elements 1 and 2 that connection is made between contacts 31 and 32 simultaneously with the closure of the circuit between contacts 11 and 12, and 21 and 22, respectively. With this arrangement the condenser $Cz$ acts as the zero range setting adjustment of the measuring circuit. It is connected to the standard cell S in half cycles alternate to those during which the balancing condenser $Cv$ is connected to the standard cell. Thus the charging of the condenser $Cz$ has an effect on the measuring circuit opposite to that caused by the charging of condenser $Cv$. Thus, effectively, in any one cycle, the algebraic sum of the charges on condensers $Cv$, $Cf$ and $Cz$ for one half cycle is equal to minus their charge in the other half cycle. By proper adjustment of the capacity of $Cz$, this negative effect may be made precisely equal to the positive effect of condenser $Cv$ when the latter is set to its minimum value. This cancels out the effect of the minimum capacity of the balancing condenser $Cv$, and thus the instrument may be made to operate as if condenser $Cv$ had an effective capacity range from zero to its desired maximum value.

By the same token, if the zero-setting condenser $Cz$ is made of sufficient capacity, the effect of $Cv$, $Cz$, and standard cell S can be made negative with respect to the operation described above. Thus the instrument may be used to measure temperatures lower than the temperature of the cold-junction of the thermocouple T when the resultant potential produced by the thermocouple circuit is reversed in polarity with respect to the polarity of the potential produced when the thermocouple is at a temperature higher than its cold-junction temperature. Thus the zero-setting condenser $Cz$ permits such "negative" temperature measurements to be made.

From the above it can be seen that the advantageous operation of a measuring instrument embodying the present invention may be rendered more flexible by the use of a plurality of potentials and associated condensers responsive to various modifying conditions and suitably connected to provide controlling or compensating modifications of the primary measurements being made. These modifications can be achieved by the use of fixed capacities and voltages responsive to the modifying conditions, or by fixed potentials and variable capacities responsive to the modifying effects.

The need for such modification of measurement occurs in many special situations, but it is most commonly encountered when the cold-junction is maintained at the room temperature and while temperatures below ambient are being measured by the thermocouple. This is quite common because the effect of cold-junction temperature is usually controlled by permitting the cold-junction to assume ambient temperature and adjusting the measuring circuit to compensate for changes in ambient temperature by some means responsive to this temperature. Such a "negative" effect can be achieved with the present invention as shown in Figure 2. In addition to the provision of this zero-setting condenser $Cz$ in the instrument shown in this figure, an arrangement also is provided for automatically adjusting for these variations in the temperature of the thermocouple cold-junction. A cold-junction compensation condenser $Cj$ is connected in parallel with the zero-setting condenser $Cz$. This condenser $Cj$ is constructed in some suitable manner, as by making one of its plates of a bi-metallic strip, to automatically adjust its capacity as a function of its temperature. The cold-junction theremocouple 100, is series with the main thermocouple T through terminals 104 as shown in the drawing, is mounted in close proximity of this cold-junction compensating condenser $Cj$, as by mounting both of them within a container, indicated by the dotted line 102. The electrical effects of a change in the capacity of condenser $Cj$, caused by a change in the cold-junction temperature, is the same as the effect of a change in the capacity of the zero-setting condenser $Cz$. Thus, if the cold-junction temperature increases, the capacity of condenser $Cj$ increases, thus reducing the negative effect introduced through the switching element 3 so that the balance position of balancing condenser $Cv$ remains the same.

With the novel arrangements of the present invention, should it prove desirable to use a ceramic type temperature responsive condenser having a negative temperature co-efficient characteristic in place of the bi-metallic strip condenser just described, such a condenser would be connected in parallel with variable condenser Cv in Figure 2 to provide the same "negative" correction effect.

It is convenient and desirable to use a commercial power supply frequency at the synchronous frequency for operation of the vibrator V and the phase differentiating circuit in the amplifier unit A. An advantage of the present invention is that such use of commercial power is possible without the necessity of expensive equipment to overcome effects normally introduced by such use. Thus in the embodiment of the invention shown in Figure 2, the energizing coil 62 of the vibrator V is connected to a commercial power supply line 71 which also is connected to the amplifier unit A through lines 69 to supply the operating voltage to the amplifier portion and to energize the phase differentiating circuit and the solenoid motor M.

When the commercial power supply frequency is utilized for this purpose, it is important to prevent stray field pickups from affecting the operation of the instrument. In order to minimize such undesired influences, a four-terminal filter network 106 is connected between the thermocouple terminals T1 and T2 and the measuring circuit. This filter 106 may be of any suitable design providing a high attenuation at the frequency of the commercial power supply line 71.

In industrial installations of instruments of the type herein described accidental grounds may occur in portions of the thermocouple circuit. Because of the desirability of grounding one terminal 53 of the amplifier unit A, such an accidental grounding of the thermocouple circuit would render the instrument inoperative or at least affect the accuracy of its measurement. In order to eliminate the effects of such unwanted ground connections, a symmetrical network arrangement, generally indicated at 108, is provided in the thermocouple circuit of Figure 2. This network 108 comprises two equal high resistance elements 110 and 112 connected in series across the thermocouple, and two equal condensers 114 and 116 similarly connected in series across the thermocouple, with the junction points between the condensers and resistors connected together and through the grounded conductor 52 to the grounded terminal 53 of amplifier unit A. By replacing the asymmetrical thermocouple connection shown in Figure 1 with this symmetrical network arrangement, the detrimental effects of accidental grounds in the thermocouple circuit are eliminated, and any pickup or parasitic voltages induced in the thermocouple circuit are cancelled out due to the symmetrical arrangement of the connections. In addition this arrangement advantageously provides a return path of high D. C. resistance and relatively low A. C. impedance between the thermocouple and the grounded terminal 53 of the amplifier unit A.

In an actual instrument for measuring temperatures up to about 1000° F. with a commercial iron-constant in thermocouple and a regular Epley standard cell, approximate values of circuit components which have been found to provide satisfactory operation are: $Cf=.01$ microfarad, $Cv=75$ to 275 micromicrofarads, $Cs=50$ micromicrofarads, and $Cj=10.7$ micromicrofarads for a range of 50° F. cold-junction temperature change. Values which are suitable for the symmetrical network 108 are: resistors 110 and $112=50{,}000$ ohms, and condensers 114 and $116=.01$ microfarad. The amplifier unit A advantageously might have an input impedance of about 5 megohms. The maximum currents drawn from the thermocouple and the standard cell by an instrument having such circuit values will not exceed 0.1 micro-ampere.

As many possible embodiments of the present invention may be made without departing from the scope thereof, it is to be understood that all matter set forth in this specification or shown in the accompanying drawings is to be interpreted as illustrative only and not in a limiting sense.

I claim:

1. In apparatus for comparing two D. C. potentials, in combination, two condensers, potential-variation detecting means, periodic switching means including electrical connecting means for periodically interconnecting said condensers with said D. C. potentials in two alternate circuit networks, means connecting said detecting means to measuring points in said circuit networks to permit detection of potential variations between said measuring points as said switching means switch from one to the other of said alternate circuit networks, and control means responsive to the magnitude and polarity of said potential variations forming a measure of the value of one D. C. potential with respect to the value of the other.

2. Apparatus operated in accordance with the comparative values of two D. C. potentials, comprising, in combination, two condensers, potential variation detecting means, periodic switching means including electrical connecting means for periodically interconnecting said condensers with said D. C. potentials in two alternate circuits, means connecting said detecting means with said circuits at measuring points for detecting potential variations between said measuring points as said switching means switch said D. C. potentials and said condensers from one alternate circuit to the other, and positionable means responsive to the magnitude and polarity of said potential variations for assuming a position which is a measure of the value of one D. C. potential with respect to the value of the other.

3. In apparatus for comparing two D. C. potentials, in combination, two condensers, high impedance potential variation detecting means, periodic switching means including electrical connecting means for periodically interconnecting said condensers with said D. C. potentials in alternate circuits, means connecting said detecting means with said circuits to permit detection of potential variations at a measuring point in said alternate circuits as said switching means switch from one to the other, and means for adjusting the value of one of said condensers to reduce said potential variations to zero whereby the adjusted value of said condenser with respect to the value of the other condenser is a measure of the value of one D. C. potential with respect to the value of the other.

4. Apparatus for developing a control potential which is a function of the comparison of two D. C. potentials, comprising, in combination, two condensers, periodic switching means including electrical connecting means for periodically interconnecting said condensers with said D. C. potentials in two alternate circuit networks, and an output connection connected to measuring points in said circuit networks to permit detection of potential variations between said measuring points as said switching means switch from one to the other of said alternate circuit networks, whereby said potential variations across said output connection form a control potential which is responsive in magnitude and phase to the difference between said two D. C. potentials.

5. In apparatus for comparing a known D. C. potential with an unknown D. C. potential, in combination, a fixed condenser, a variable condenser, potential change detecting means, cyclically-operated switching means including electrical connecting means for cyclically interconnecting said condensers with said D. C. potentials in alternate circuit networks to produce a potential distribution therein, means connecting said detecting means in said circuit networks to detect potential changes in said circuit networks as said switching means switches said condensers and said D. C. potentials from one alternate circuit network to the other, and means for adjusting the value of said variable condenser to tend to reduce said changes of potential to zero whereby the adjusted value of said variable condenser may be calibrated to be a measure of the value of the unknown D. C. potential.

6. Apparatus for comparing the value of an unknown condition to the value of a known condition, comprising, in combination, a first potential source whose voltage is a function of the value of an unknown condition to be compared with a known condition, a first condenser, means connecting one terminal of said first condenser to one terminal of said first potential source, a second potential source whose voltage is a function of the value of said known condition, a second condenser, means connecting one terminal of said second condenser to one terminal of said second potential source, first circuit means connecting the other terminals of said potential sources, second circuit means connecting the other terminals of said condensers, null-voltage detecting means connected between said first and second circuit means to detect unbalance voltage therebetween, and means for adjusting the value of one of said condensers in a direction tending to produce a null-voltage at said detecting means, whereby the capacity of said adjusted condenser is a measure of the value of said unknown condition in terms of the value of said known condition when said detecting means produces a null-voltage response.

7. Apparatus for comparing the values of two D. C. potentials, comprising, in combination, a first circuit including a first D. C. potential whose voltage is to be compared with a second D. C. potential, a first condenser, a second circuit including said second D. C. potential, a second condenser, first connecting means joining one terminal of each of said two D. C. circuits, second connecting means joining one terminal of each of said condensers, cyclically-operated means for periodically connecting the other terminal of said first condenser alternately from one terminal to another of said first D. C. circuit, means operated in synchronism with said cyclically-operated means for periodically connecting the other terminal of said second condenser alternately from one terminal to another of said second D. C. circuit, voltage-change detecting means connected between said first and second connecting means to detect voltage change as said cyclically-operated means change from one connection to the other, and means for adjusting the value of one of said condensers in a direction tending to apply the same voltage to said voltage-change detecting means when said cyclically-operated means make each of their alternate connections, whereby the capacity of said adjusted condenser is a measure of the value of said first D. C. potential as compared with the value of said second D. C. potential when no voltage change occurs at said detecting means during said alternate connections.

8. Apparatus for producing a control potential which is a measure of the difference between the value of an unknown condition and a predetermined value thereof, comprising, in combination, a first circuit including a D. C. potential which is proportional to the unknown condition, a first condenser, a second circuit including a known D. C. potential, a second condenser, first connecting means joining one terminal of each of said two D. C. circuits, second connection means joining one terminal of each of said condensers, cyclically-operated means for periodically connecting the other terminal of said first condenser alternately from one terminal to another of said first D. C. circuit, and means operated in synchronism with said cyclically-operated means for periodically connecting the other terminal of said second condenser alternately from one terminal to another of said second D. C. circuit, whereby the change in potential between said first and second connecting means as said cyclically-operated means change from one connection to the other produces a control potential which in magnitude and phase is a measure of the difference between said unknown condition and a predetermined value thereof determined by the values of said known D. C. potential and said condensers.

9. Apparatus for producing a control potential which is a measure of the difference between the value of an unknown D. C. potential and a predetermined value thereof, comprising, in combination, a first circuit including an unknown D. C. potential, a first condenser, a second circuit including a known D. C. potential, a second condenser, first connecting means joining one terminal of said first D. C. circuit to the terminal of opposite polarity of said second D. C. circuit, second connection means joining one terminal of each of said condensers, cyclically-operated means for periodically connecting the other terminal of said first condenser alternately from the negative terminal to the positive terminal of said first D. C. circuit, and means operated in synchronism with said cyclically-operated means for periodically connecting the other terminal of said second condenser alternately from the positive terminal to the negative terminal of said second D. C. circuit, whereby the change in potential between said first and second connecting means as said cyclically-operated means change from one connection to the other produces a control potential which in magnitude and phase is a measure of the difference between said unknown D. C. potential and a predetermined value thereof determined by the values of said known D. C. potentials and said condensers.

10. Apparatus for producing a control potential which is a measure of the difference between the value of an unknown D. C. potential and a predetermined value thereof, comprising, in combination, a first circuit including an unknown D. C. potential, a first condenser, a second circuit including a known D. C. potential, a second condenser, first connecting means joining the positive terminal of said first D. C. circuit to the negative of said second D. C. circuit, second connection means joining one terminal of each of said condensers, cyclically-operated means for periodically connecting the other terminal of said first condenser alternately from the negative terminal to the positive terminal of said first D. C. circuit, and means operated in synchronism with said cyclically-operated means for periodically connecting the other terminal of said second condenser alternately from the positive terminal to the negative terminal of said second D. C. circuit, whereby the change in potential between said first and second connecting means as said cyclically-operated means change from one connection to the other produces a control potential which in magnitude and phase is a measure of the difference between said unknown D. C. potential and a predetermined value thereof determined by the values of said known D. C. potentials and said condensers.

11. Apparatus for measuring an unknown D. C. potential, comprising, in combination, a first circuit including the source of unknown D. C. potential to be measured, a first condenser, a second circuit including a source of known D. C. potential, a second condenser, first connecting means joining one terminal of each of said first and second D. C. potential circuits, second connecting means joining one terminal of each of said condensers, cyclically-operated means for periodically connecting the other terminal of said first condenser alternately from one terminal to another of said unknown D. C. potential circuit, means operated in synchronism with said cyclically-operated means for periodically connecting the other terminal of said second condenser alternately from one terminal to another of said known D. C. potential circuit, voltage sensitive means connected between said first and second connecting means and responsive to the unbalance voltage therebetween, and means operated by said voltage sensitive means to adjust the value of one of said condensers in a direction tending to reduce said unbalance voltage to zero, whereby the capacity of said adjusted condenser is a measure of the value of said unknown D. C. potential as compared with the value of said known D. C. potential when said voltage sensitive means indicates zero.

12. Apparatus for measuring an unknown D. C. potential, comprising, in combination, a first circuit including a source of the unknown D. C. potential to be measured, a first condenser, a second circuit including a source of known D. C. potential, a second condenser, a third condenser, first connecting means joining one terminal of each of said first and second D. C. potential circuits, second connecting means joining one terminal of each of said condensers, cyclically-operated first switching means for periodically connecting the other terminal of said first condenser alternately from one terminal to another of said unknown D. C. potential source, second switching means operated in synchronism with said first switching means for periodically connecting the other terminal of said second condenser alternately from one terminal to another of said known D. C. potential source, third switching means operated in synchronism with said first and second switching means for periodically connecting the other terminal of said third condenser alternately from one terminal to another of said known D. C. potential source in inverse order to the similar connection made by said second switching means, voltage sensitive means connected between said first and second connecting means, means to set said third condenser to determine the zero axis of measurement, and means for adjusting the value of said first or second condenser in a direction tending to apply the same voltage to said voltage sensitive means when said cyclically-operated switching means make each of their alternate connections, whereby the capacity of said adjusted condenser is a measure of the value of said unknown D. C. potential as compared with the value of said known D. C. potential when said alternate voltages are equal.

13. Apparatus for producing a control potential which is a measure of the difference between the value of an unknown D. C. potential and a predetermined value thereof, comprising, in combination, a first circuit including a source of the unknown D. C. potential to be measured, a first condenser, a second circuit including a source of known D. C. potential, a second condenser, a third condenser, first connecting means joining one terminal of each of said first and second D. C. potential circuits, second connecting means joining one terminal of each of said condensers, cyclically-operated first switching means for periodically connecting the other terminal of said first condenser alternately from one terminal to another of said unknown D. C. potential source, second switching means operated in synchronism with said first switching means for periodically connecting the other terminal of said second condenser alternately from one terminal to another of said known D. C. potential source, third switching means operated in synchronism with said first and second switching means for periodically connecting the other terminal of said third condenser alternately from one terminal to another of said known D. C. potential source in inverse order to the similar connection made by said second switching means, and means to set said third condenser to determine said predetermined value of said unknown D. C. potential, whereby the change in potential between said first and second connecting means as said cyclically-operated switching means change from one to the other of their alternate connections produces a control potential which in magnitude and phase is a measure of the difference between said unknown D. C. potential and said predetermined value thereof.

14. Apparatus for comparing a standard D. C. potential with an unknown D. C. potential, comprising, in combination, a source of standard D. C. potential, a source of unknown D. C. potential, a first condenser, a second condenser, first circuit means for connecting said condensers to be equally charged, second circuit means for applying said standard D. C. potential to said first condenser, third circuit means for applying said unknown D. C. potential to said second condenser, unbalance voltage detecting means responsive to an unbalance voltage between said first circuit means and said other circuit means, and means for adjusting the capacity ratio of said first condenser to said second condenser to the ratio necessary to establish a voltage balance as indicated by said detecting means, whereby said capacity ratio is a direct measure of the relationship of said unknown D. C. potential to said known D. C. potential.

15. In a system for measuring temperature including a thermocouple element whose temperature is to be measured by comparing the voltage produced by the thermocouple with the voltage of a standard cell in a balanceable network the output of which is connected to a null-voltage detecting means that controls rebalancing means which readjusts the balanceable network which includes the thermocouple and its connecting circuit and the standard cell and its connecting circuit and in which the load on the standard cell is independent of the balance condition of the network, the network comprising a first condenser, means connecting one terminal of said first condenser to one terminal of said thermocouple circuit, a second condenser, means connecting one terminal of said second condenser to one terminal of said standard cell circuit, first connection means joining other terminals of said thermocouple and standard cell circuits, second connection means joining the other terminals of said condensers, said null-voltage detecting means being connected between said first and second connection means to detect unbalance voltage therebetween, said rebalancing means being arranged to adjust the value of one of said condensers in a direction tending to produce a null-voltage in said detecting means, whereby the capacity of said adjusted condenser is a measure of the temperature being measured when said detecting means produces a null-voltage response.

16. In a system for measuring temperature including a thermocouple element whose temperature is to be measured by comparing its voltage with that produced by a sandard cell of known potential in a balanceable network wherein the load on the standard cell is independent of the balance condition of the network, the network being connected to voltage sensitive means that controls rebalancing means for said network, the network comprising a circuit including said thermocouple for producing a D.-C. voltage which is a function of said temperature, a first condenser, a circuit including said standard cell, a second condenser, first connecting means joining one terminal each of said thermocouple and standard cell circuits, second connecting means joining one terminal of each of said condensers, cyclically-operated first switching means for periodically connecting the other terminal of said first condenser alternately from one terminal to another of said thermocouple circuit, second switching means operated in synchronism with said first switching means for periodically connecting the other terminal of said second condenser alternately from one terminal to another of said standard cell circuit, said voltage sensitive means being connected between said first and second connecting means, said rebalancing means being arranged to adjust the value of said second condenser in a direction tending to apply the same voltage to said voltage sensitive means when said cyclically-operated switching means make each of their alternate connections, whereby the adjusted capacity of said second condenser is a measure of the temperature being measured when said alternate voltages are equal.

17. In a system for measuring temperature including a thermocouple element whose temperature is to be measured by comparing its potential with that of a standard cell of known potential, and in which voltage sensitive means responsive to unbalance voltage rebalances the system to reduce the unbalance voltage to zero, a balanceable network wherein the load on the standard cell is independent of the balance condition of the network and which is not affected by alternating voltages induced in the thermocouple leads, said network comprising a symmetrical impedance network having a midpoint terminal and being connected across the terminals of said thermocouple element, a first condenser, a circuit including said standard cell, a second condenser, first connecting means joining on terminal of said standard cell circuit to the midpoint terminal of said symmetrical network, second connecting means joining one terminal of each of said condensers, cyclically-operated first switching means for periodically connecting the other terminal of said first condenser alternately from one terminal to another of said thermocouple element, second switching means operated in synchronism with said first switching means for periodically connecting the other terminal of said second condenser alternately from one terminal to another of said standard cell circuit, said voltage sensitive means being connected between said first and second connecting means and being arranged to adjust the value of said second condenser, the adjusted capacity of said second condenser being a measure of the temperature being measured when the unbalance voltage is zero.

18. In apparatus for recording the value of a condition wherein the value of a first condition is compared with the value of a second condition by means of a network whose output signal is connected to null-voltage detecting means that controls motor means arranged to readjust the network to reduce its output signal and in which the motor means records the relative value of said first condition on a record chart, a network comprising a first potential source whose voltage is a function of the value of said first condition, a first condenser, means connecting one terminal of said first condenser to one terminal of said first potential source, a second potential source whose voltage is a function of the value of said second condition, a second condenser, means connecting one terminal of said second condenser to one terminal of said second potential source, first circuit means connecting other terminals of said potential sources, second circuit means connecting the other terminals of said condensers, means connecting said null-voltage detecting means between said first and second circuit means to detect unbalance voltage therebetween, said motor means which is responsive to operation of said detecting means being arranged to adjust the value of one of said condensers, whereby the capacity of said adjusted condenser is a record of the relative value of said first and second conditions whenever said detecting means produces a null-voltage response.

19. In apparatus for measuring temperature including a thermocouple element whose temperature is to be measured by comparing its potential with that of a standard potential cell, wherein the load on said standard cell is independent of the adjustment of said apparatus and wherein voltage-sensitive means responsive to an unbalance voltage produced by the apparatus controls rebalancing mechanism arranged to readjust the apparatus to reduce the voltage applied to the voltage-sensitive means, a balanceable voltage comparison network comprising a circuit including said thermocouple, a first condenser, a circuit including said standard potential cell, a second condenser, a third condenser, first connecting means joining one terminal each of said thermocouple and standard cell circuits, second connecting means joining one terminal of each of said condensers, a cyclically-operated first switching means for periodically connecting the other terminal of said first condenser alternately from one terminal to another of said thermocouple circuit, second switching means operated in synchronism with said first switching means for periodically connecting the other terminal of said second condenser alternately from one terminal to another of said standard cell circuit, third switching means operated in synchronism with said first and second switching means for periodically connecting the other terminal of said third condenser alternately from one terminal to another of said standard cell circuit in inverse order to the similar connection made by said second switching means, means connecting said voltage sensitive means between said first and second connecting means, means to set said third condenser to determine the zero point of the range of temperature to be measured, and means connecting said rebalancing means to adjust the value of said second condenser in a direction tending to reduce said unbalance voltage to zero, whereby the adjusted capacity of said second condenser is a measure of the temperature being measured above said zero value when said unbalance voltage is zero.

20. In apparatus for measuring temperature including a thermocouple having one junction exposed to the temperature to be measured and a cold junction at a different temperature wherein the temperature of the thermocouple is measured by comparing its potential with that of a standard potential cell by means of a balanceable network connected to voltage-sensitive means arranged to rebalance the network and wherein compensation is made automatically for temperature variations of the cold junction, the balanceable network comprising a circuit including said thermocouple, a first condenser, a circuit including said standard potential cell, a second condenser, a temperature responsive condenser mounted in proximity to said cold junction of said thermocouple to have its capacity changed with change in the cold junction temperature, a first connecting circuit joining one terminal of each of said thermocouple and standard cell circuits, a second connecting circuit joining one terminal of each of said condensers, cyclically-operated first switching means for periodically connecting the other terminal of said first condenser alternately from one terminal to another of said thermocouple circuit, second switching means operated in synchronism with said first switching means for periodically connecting the other terminal of said second condenser alternately from one terminal to another of said standard cell circuit, third switching means operated in synchronism with said first and second switching means for periodically connecting the other terminal of said temperature responsive condenser alternately from one terminal to another of said standard cell circuit in reverse order to the similar connection made by said second switching means, said voltage sensitive means being connected between said first and second connecting circuits and arranged to adjust the value of said second condenser in a direction tending to reduce said unbalance voltage to zero, whereby the adjusted capacity of said second condenser when said unbalance voltage is zero is a measure of the temperature of said thermocouple irrespective of changes in cold junction temperature.

21. In apparatus for measuring temperature including a thermocouple element having one junction exposed to the temperature to be measured and a cold junction at a different temperature wherein the temperature of the thermocouple is measured by comparing its potential with that of a standard potential cell by means of a balanceable network connected to voltage-sensitive means arranged to rebalance the network and wherein compensation is made automatically for temperature variations of the cold junction, the balanceable network comprising a circuit including said thermocouple, a fixed-value condenser, a circuit including said standard potential cell, a variable condenser, an adjustable condenser, a temperature responsive condenser connected in parallel with one of said two last-named condensers and mounted in proximity to said cold junction of said thermocouple to have its capacity changed with change in the cold junction temperature, a first connecting circuit joining one terminal of each of said thermocouple and standard cell circuits, a second connecting circuit joining one terminal of each of said condensers, cyclically-operated first switching means for periodically connecting the other terminal of said fixed-value condenser alternately from one terminal to another of said thermocouple circuit, second switching means operated in synchronism with said first switching means for periodically connecting the other terminal of said variable condenser alternately from one terminal to another of said standard cell circuit, third switching means operated in synchronism with said first and second switching means for periodically connecting the other terminal of said adjustable condenser alternately from one terminal to another of said standard cell circuit in reverse order to the similar connection made by said second switching means, and means for setting said adjustable condenser to determine the zero point of the temperature to be measured, said voltage sensitive means being connected between said first and second connecting circuits and arranged to adjust the value of said variable condenser in a direction tending to reduce said unbalance voltage to zero, whereby the adjusted capacity of said variable condenser is a measure of the temperature of said thermocouple irrespective of changes in cold junction temperature when said unbalance voltage is zero.

22. In a system for measuring temperature including a thermocouple element whose temperature is to be measured by comparing its potential with that of a standard cell of known potential, and in which voltage sensitive means responsive to unbalance voltages rebalances the system to reduce the unbalance voltage to zero, a balanceable network wherein the load on the standard cell is independent of the balance condition of the network and which is not affected by alternating voltages induced in the thermocouple leads, said network comprising a symmetrical impedance network having a midpoint terminal and being connected across the terminals of said thermocouple element, a fixed-value condenser, a circuit including said standard cell, a variable condenser, an adjustable condenser, a temperature responsive condenser connected in parallel with said adjustable condenser and mounted in proximity to the cold junction of said thermocouple to have its capacity changed with change in the cold junction temperature, first connectting means joining one terminal of said standard cell circuit to the midpoint terminal of said symmetrical network, second connecting means joining one terminal of each of said condensers, cyclically-operated first switching means for periodically connecting the other terminal of said fixed-value condenser alternately from one terminal to another of said thermocouple element, second switching means operated in synchronism with said first switching means for periodically connecting the other terminal of said variable condenser alternately from one terminal to another of said standard cell circuit, third switching means operated in synchronism with said first and second switching means for periodically connecting the other terminals of said adjustable condenser and said temperature responsive condenser alternately from one terminal to another of said standard cell circuit in reverse order to the similar connection made by said second switching means, vibratory motor means for operating said first, second, and third switching means in synchronism, said voltage sensitive means being connected between said first and second connecting means and being arranged to adjust the value of said variable condenser, the adjusted capacity of said variable condenser being a measure of the temperature being measured when the unbalance voltage is zero.

23. In a system for recording temperature including a thermocouple element whose temperature is to be measured by comparing its potential with that of a standard cell and in which voltage sensitive means responsive to unbalance voltage controls a motor that rebalances the system to reduce the unbalance voltage to zero and records the temperature on a suitable chart, a balanceable network wherein the load on the standard cell is independent of the balance condition of the network and which is not affected by alternating voltages induced in the thermocouple leads, said network comprising a symmetrical impedance network having a center tap and being connected across the terminals of said thermocouple element, a fixed-value condenser, a circuit connected to said standard potential cell, a variable condenser, an adjustable condenser, a variable-value compensating condenser connected in parallel with said adjustable condenser means varying the value of said compensating condenser as a function of the temperature of the cold junction of said thermocouple, a first connecting circuit joining one terminal of said standard cell circuit to the center tap of said symmetrical network, a second connecting circuit joining one terminal of each of said condensers, cyclically-operated first switching means for periodically connecting the other terminal of said fixed-value condenser alternately from one terminal to another of said thermocouple element, second switching means operated in synchronism with said first switching means for periodically connecting the other terminal of said variable condenser alternately from one terminal to another of said standard cell circuit, third switching means operated in synchronism with said first and second switching means for periodically connecting the other terminals of said adjustable condenser and said variable-value compensating condenser alternately from one terminal to another of said standard cell circuit in reverse order to the similar connection made by said second switching means, vibratory motor means for operating said first, second, and third switching means synchronously, said voltage sensitive means being connected between said first and second connecting circuits, said motor being arranged to adjust the value of said variable condenser in a direction tending to reduce said unbalance voltage to zero, and means for setting said adjustable condenser to determine the zero point of the range of temperature to be measured, whereby the adjusted capacity of said variable condenser as indicated on said chart is a measure of the temperature of said thermocouple with respect to said zero value, irrespective of changes in cold junction temperature, when said unbalance voltage is zero.

24. Capacity-rebalancing apparatus for comparing a known D. C. potential with an unknown D. C. potential comprising a network including a first fixed condenser and a second variable condenser, potential change detecting means, said network having two measuring points one of which is connected ot one terminal of each of said condensers, cyclically-operated switching means connected to said network and having first and second positions and arranged when in their first positions to connect said known and unknown D. C. potentials, respectively, to charge said first and second condensers and when in their second positions to disconnect said D. C. potentials therefrom, drive means arranged to operate periodically said switching means alternately between one and the other of their positions, means connecting said detecting means to said measuring points in said network to detect potential changes in said network as said switching means operate between one and the other of their positions, and means under the control of the potential-detecting means arranged to vary the value of said adjustable condenser in a direction tending to minimize the variation in voltage between said measuring points, whereby the adjusted value of said variable condenser may be calibrated to be a measure of the value of the unknown D. C. potential.

25. In a measuring circuit for comparing a standard D. C. potential with an unknown potential, apparatus comprising a source of standard D. C. potential, a source of unknown D. C. potential, first and second switch terminals, a first adjustable condenser, a second condenser, first circuit means connecting said condensers in series between said switch terminals to be equally charged, first and second output terminals, said first output terminal being connected to said first circuit means, first and second switching means each having first and second positions, said first switching means being arranged when in its first position to connect said unknown poential source between said first switch terminal and said second output terminal and when in its second position to connect said first switch terminal to said second output terminal, said second switching means being arranged when in its first position to connect said standard potential source between said second switch terminal and said second output terminal and when in its second position to connect said second switch terminal to said second output terminal, unbalance voltage detecting means connected to said output terminals and responsive to potential changes therebetween as said switching means are operated, and a motor controlled by said voltage detecting means and coupled to said first condenser to adjust its capacitance in a direction tending to change the ratio of the capacitances of said first and second condensers to the ratio necessary to establish a voltage balance as indicated by said detecting means, whereby said capacitance ratio is a direct measure of the relationship of said unknown D. C. potential to said known potential.

26. Apparatus as claimed in claim 25 wherein said adjustable condenser is connected to said second switch terminal.

27. Capacity-rebalancing measuring apparatus comprising switching means having first and second switching terminals, first and second reference terminals and first and second measuring terminals, said first and second measuring terminals being connected to the respective terminals of opposite polarity of a source of unknown unidirectional voltage to be measured, a source of substantially constant unidirectional voltage, said first and second reference terminals being connected to the respective terminals of opposite polarity of said constant voltage source, voltage responsive means, first and second output terminals connected to the input portion of said voltage responsive means, a fixed capacitor having a substantially constant capacity, a rebalancing capacitor having a variable capacity dependent on the adjustment thereof, and conductor means connecting said capacitors in series, said first output terminal being connected to the junction between said capacitors, said second output terminal being connected to said switching means, said switching means being operative, when energized, to connect said first and second measuring terminals in rapid alternation to said first switching terminal at a predetermined rate, and to connect said first and second reference terminals to said second switching terminal in rapid alternation at said rate.

WILFRED H. HOWE.

REFERENCES CITED

The following references are of record in the file of this patent:

UNITED STATES PATENTS

| Number | Name | Date |
|---|---|---|
| 1,377,274 | Porter | May 10, 1921 |
| 2,105,598 | Hubbard | Jan. 18, 1938 |
| 2,109,222 | Ryder | Feb. 22, 1938 |
| 2,154,375 | Chambers | Apr. 11, 1939 |
| 2,322,498 | Zeitlin | June 22, 1943 |